United States Patent [19]

Boyd et al.

[11] Patent Number: 4,673,195
[45] Date of Patent: Jun. 16, 1987

[54] AUTOMOTIVE SEAT BELT ASSEMBLY FOR ENCOURAGING PASSENGER USE

[76] Inventors: James B. Boyd, Rte. 6, Box 6052, Hermiston, Oreg. 97838; Kathleen A. Abell, Rte. 2, Box 2713, La Grande, Oreg. 97850

[21] Appl. No.: 820,668

[22] Filed: Jan. 21, 1986

[51] Int. Cl.$^4$ .............................................. B60R 22/00
[52] U.S. Cl. ................................ 280/801; 307/10 SB
[58] Field of Search ................ 280/801; 180/270, 273; 297/468; 340/52 E; 307/10 SB

[56] References Cited

U.S. PATENT DOCUMENTS

| | | | |
|---|---|---|---|
| 2,510,115 | 6/1950 | Jokosky | 340/52 E |
| 3,074,055 | 1/1963 | Rudolph et al. | 180/273 |
| 3,455,410 | 7/1969 | Wilson | 180/270 |
| 3,624,601 | 11/1971 | Routzahn | 180/270 |

Primary Examiner—John J. Love
Assistant Examiner—Karin L. Ferriter
Attorney, Agent, or Firm—Chernoff, Vilhauer, McClung & Stenzel

[57] ABSTRACT

An automotive passenger seat belt contains a selectively energizable and de-energizable DC electrical outlet into which the passenger may plug various electrical entertainment devices, such as radios, stereos, electronic games and the like to receive operating power. Energization of the electrical outlet is controlled by a switch which is placed in its energizing position only in response to coupling of the two seat belt portions together, indicating that the seat belt is being used. The electrical outlet is automatically de-energized in response to decoupling of the seat belt portions. The electrical outlet has an adjustment to provide different DC voltages for different types of electrical devices which may be connected thereto. An optional remote indicator can also be connected to the switch to indicate whether or not the seat belt portions are coupled.

6 Claims, 2 Drawing Figures

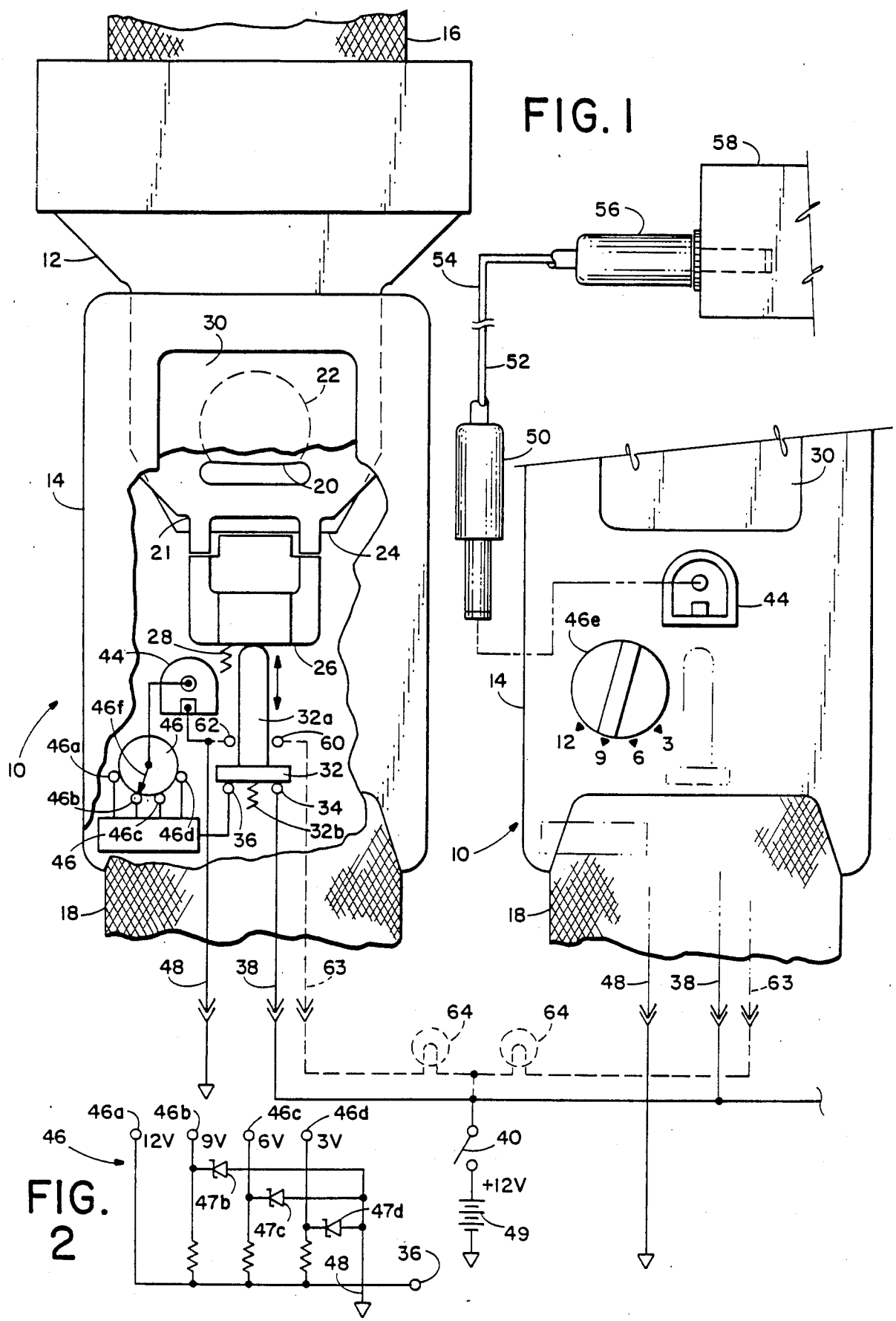

4,673,195

AUTOMOTIVE SEAT BELT ASSEMBLY FOR ENCOURAGING PASSENGER USE

BACKGROUND OF THE INVENTION

This invention relates to improvements in automotive seat belts for the protection of passengers, and particularly to means for encouraging a passenger to use a seat belt.

Despite their proven effectiveness, and status as standard equipment on automobiles, passenger seat belts are unused by a large segment of the population. In some states, this has prompted laws making it a violation for persons, especially children, to ride without use of a seat belt. However such laws are of questionable effectiveness since the driver of the vehicle is not always aware when young passengers, particularly in the back seat of the vehicle, have failed to use them.

Accordingly, a system is needed for encouraging passengers, particularly younger ones, to use their seat belts without constant monitoring by the driver of the vehicle. Also, it would be advantageous for the driver to be informed automatically when a particular seat belt is not in use.

SUMMARY OF THE PRESENT INVENTION

The present invention comprises an automotive seat belt system which, as a result of its unique structure, provides an incentive for passengers to utilize it. In addition, it provides means for alerting the driver of any seat belt not being utilized.

The primary objective of the invention, i.e. providing an incentive for utilization of the seat belt, is accomplished by incorporating a passenger-accessible, DC electrical outlet in the belt structure which is readily adaptable for connection to portable radios, tape cassette players, electronic games and other portable electronic devices to power them. The electrical outlet is energized by a switch only in response to connection of the two seat belt portions, and is otherwise de-energized if the belt portions are not connected. Accordingly, if the automobile is supplied with one or more portable radios, cassette players, electronic games, etc., without batteries, such devices can be utilized by a passenger only if he couples his seat belt thereby making the electrical outlet available as a power source.

The outlet can be equipped with a voltage adjustment so that it can provide three, six, nine or twelve volts selectively, making it adaptable for powering virtually all available types of portable electronic entertainment devices. Preferably, the electrical outlet is mounted on the belt coupling device itself, both for convenient passenger access and for convenient connection to its belt coupling-responsive energizing switch.

The energizing switch can also be utilized to selectively energize and de-energize a remote, driver-accessible indicator (which can be a visual display and/or an audible indicator) telling the driver when a particular seat belt is not being utilized, and the location of such seat belt.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partially schematic illustration of a pair of identical seat belts, each equipped with an exemplary embodiment of the invention.

FIG. 2 is a schematic diagram of an exemplary type of voltage selector usable with the present invention.

DESCRIPTION OF THE PREFERRED EMBODIMENT

With reference to FIG. 1, a pair of identical vehicle seat belts, each indicated generally as 10, are shown. Each belt has a coupling device comprising a male member 12 and female member 14 for detachably coupling a pair of belt portions 16 and 18 together. Belt portion 18 is preferably the fixed, nonextensible belt portion, normally positioned toward the center of the vehicle, and belt portion 16 is the extensible/retractable portion of the seat belt.

The belt coupling device shown is conventional with respect to its coupling features, and may alternatively be of any other conventional design. The male member 12 slides into the female member 14 until a lip 20 of a latch 21 within the female member 14 snaps into a mating aperture 22 formed in the male member 12, thereby coupling the belt portions 16 and 18 together. During the insertion of the male member 12, the tip 24 thereof engages a slidable, spring-biased member 26 mounted in the female member 14, forcing it rearwardly (downwardly in FIG. 1) against the force of a compression spring 28. Subsequently, when it is desired to decouple the belt portions 16 and 18, the passenger presses a release 30, thereby lifting the lip 20 out of engagement with the aperture 22 and allowing the slidable member 26 to eject the male member 12.

In order to accomplish the objectives of the present invention, certain unique features are added to the female member 14 of the seat belt coupling device. An electrical switch 32 is provided within the housing of the female member, such switch having a forwardly-extending plunger 32a biased into engagement with the rear surface of the sliding member 26 by a compression spring 32b. The switch 32 makes contact between terminals 34 and 36, respectively, when it is pushed rearwardly by the sliding member 26 in response to the insertion of the male member 12 into coupling position within the female member 14. Terminal 34 is connected by an electrical conductor 38, which extends between two plies of material constituting belt portion 18, to the vehicle ignition switch 40 and, if the switch 40 is closed, to the vehicle battery 49. The establishment of contact between the terminals 34 and 36 thus energizes a DC outlet 44 through a voltage selector 46, the outlet being grounded through an electrical conduit 48 extending through the belt portion 18 between the two plies of belt material together with conductor 38. The DC outlet 44 is mounted atop the housing of the female coupling member 14 so as to be readily accessible to the passenger utilizing the seat belt.

Energizing of the outlet 44 in response to the coupling of the belt portions 16 and 18 makes the outlet available for operative insertion of a standard jack-type connector 50. The connector 50 is joined by a cord, having a pair of electrical conduits 52, 54, to a further standard jack-type connector 56 which can be plugged into the external power source socket of any conventional DC-powered, portable electronic device 58 such as a portable radio, tape cassette player, electronic game, or the like. The device 58 is preferably kept in the vehicle without batteries, such that energizing of the outlet 44 is necessary to enable the passenger to operate the device 58.

DC-powered, portable electronic devices of the types mentioned above do not all operate at the same input voltage. Rather, some are designed to operate at three volts, some at six volts, some at nine volts and some at twelve volts. The voltage selector 46, likewise mounted within the housing of the female coupling member 14, permits the passenger to select a voltage at the outlet 44 matching that for which a particular electronic device 58 is designed. Preferably the voltage selector 46 has four output terminals 46a, 46b, 46c and 46d of twelve-, nine-, six- and three-volt potentials, respectively, voltage selection being by means of a multi-position switch 46f controlled by a manually operated dial 46e on the exterior surface of the female member 14. It is preferable that each voltage level be substantially independent of the impedance of the electronic device 58 which is to be powered. Such impedance-independent voltage selection can be obtained in different ways. One possible way, illustrated in FIG. 2, is to provide each terminal 46b, 46c and 46d with a respective Zener diode 47b, 47c and 47d having a respective breakdown voltage equal to the voltage desired at the respective terminal. Terminal 46a, having the same voltage as that of the vehicle battery 49, would require no diode.

When the belt portions 16 and 18 are decoupled by pressing the release 30, causing the ejection of male coupling member 12, both the sliding member 26 of the female member 14 and the switch 32 are permitted to move forward under the influence of their biasing springs 28 and 32b, respectively. This movement breaks the contact between terminals 34 and 36 and thereby automatically de-energizes the outlet 44 in response to the decoupling of the belt portions 16 and 18. Thus, the outlet 44 is unavailable to power any electronic devices 58 when the seat belt is decoupled.

An optional further pair of terminals 60 and 62 may be provided, between which the switch 32 makes contact in response to decoupling of the belt portions. Terminal 62 is grounded through conductor 48 as shown. Terminal 60 is connected through a further conductor 63, likewise extending between the plies of the belt portion 18 together with conductors 48 and 38, to one of a plurality of indicator lights 64 mounted remotely from the seat belt, preferably on the vehicle dashboard within easy view of the vehicle driver and arranged in an array corresponding to the locations of the respective seat belts in the vehicle. Decoupling of the seat belt portions, and resultant forward movement of the switch 32 making contact between terminals 60 and 62, completes a circuit through the respective indicator light 64 associated with the respective seat belt, thereby illuminating the light and informing the driver that the belt is decoupled.

Many variations to the preferred embodiment described above are possible without departing from the scope of the present invention. For example, switch arrangements other than that represented by switch 32, which make and break electrical connections in response to the coupling and decoupling of the seat belt portions, can be used. In fact, the contact between the male coupling member 12 and female coupling member 14 can, itself, constitute a switch if desired, although this would require the presence of conductors in the extensible belt portion 16 as well as in the nonextensible belt portion 18. Moreover, the electrical outlet 44 need not necessarily be mounted on the belt coupling device, since other passenger-accessible locations for the outlet 44 are feasible. Moreover, although the voltage selector 46 is highly desirable, its presence is not critical to the invention since the outlet 44 could be energized at only the most common voltage used by portable electronic devices, or a plurality of outlets, each energized at a different voltage, could be provided. The indicator lights 64 and their related terminals 60 and 62 need not necessarily be provided in conjunction with the outlet 44, and vice versa. Also the lights 64 may be used in conjunction with, or replaced by, an audible type of indicator.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a vehicle seat belt having a pair of selectively detachable belt portions for securing a passenger when said portions are coupled together, and selectively detachable belt coupling means for coupling said belt portions together, the improvement which comprises an electrical switch connected to an electrical power source and having selective energizing and de-energizing positions, a passenger-accessible electrical outlet connected to said switch so as to be selectively energized when said switch is in said energizing position and de-energized when said switch is in said de-energizing position, and means interconnecting said switch with said belt coupling means for placing said switch in said energizing position automatically in response to the coupling of said belt portions by said belt coupling means, and automatically placing said switch in said de-energizing position in response to the decoupling of said belt portions by said belt coupling means.

2. The apparatus of claim 1 wherein said electrical outlet is mounted on said belt-coupling means.

3. The apparatus of claim 1 wherein said electrical switch is mounted on said belt-coupling means.

4. The apparatus of claim 1, further including passenger-adjustable means interposed between said electrical outlet and said power source for selectively varying the voltage level at said electrical outlet.

5. The apparatus of claim 1, further including indicator means remotely connected to said electrical switch for indicating the decoupling of said belt portions in response to said electrical switch being in its de-energizing position.

6. The apparatus of claim 5 wherein said indicator means comprises a visual indicator.

* * * * *